(12) United States Patent
Haddad

(10) Patent No.: US 7,881,468 B2
(45) Date of Patent: Feb. 1, 2011

(54) SECRET AUTHENTICATION KEY SETUP IN MOBILE IPV6

(75) Inventor: Wassim Haddad, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1196 days.

(21) Appl. No.: 11/101,524

(22) Filed: Apr. 8, 2005

(65) Prior Publication Data

US 2006/0227971 A1 Oct. 12, 2006

(51) Int. Cl.
H04K 1/00 (2006.01)

(52) U.S. Cl. .................. 380/247; 380/255; 380/270; 713/150; 713/168; 713/171; 713/182; 726/2; 455/432.1; 709/227; 370/338; 370/349

(58) Field of Classification Search ............. 713/155, 713/168, 170, 171, 182, 150, 162; 380/247, 380/270, 282; 455/410, 411, 432.1; 726/2, 726/26; 370/338, 349; 709/227, 238
See application file for complete search history.

(56) References Cited

U.S. PATENT DOCUMENTS

| | | | |
|---|---|---|---|
| 6,721,297 B2* | 4/2004 | Korus et al. ............... 370/338 |
| 6,999,437 B2* | 2/2006 | Krishnamurthi et al. .... 370/331 |
| 7,133,669 B2* | 11/2006 | Nair et al. ................ 455/432.1 |
| 7,155,500 B2* | 12/2006 | Nikander .................... 709/223 |
| 7,228,431 B2* | 6/2007 | Haddad et al. .............. 713/182 |
| 7,269,166 B2* | 9/2007 | Koskiahde et al. .......... 370/352 |
| 7,401,216 B2* | 7/2008 | Arkko et al. ................ 713/153 |
| 7,426,746 B2* | 9/2008 | Mononen et al. ............ 726/4 |
| 2003/0084293 A1* | 5/2003 | Arkko et al. ................ 713/168 |
| 2003/0091030 A1* | 5/2003 | Yegin et al. ................. 370/352 |
| 2003/0211842 A1* | 11/2003 | Kempf et al. .............. 455/411 |
| 2004/0179688 A1* | 9/2004 | Lee ............................ 380/270 |
| 2005/0172333 A1* | 8/2005 | Kim .............................. 726/5 |
| 2005/0286471 A1* | 12/2005 | Yang et al. .................. 370/331 |
| 2006/0002351 A1* | 1/2006 | Madour ...................... 370/338 |
| 2006/0002356 A1* | 1/2006 | Barany et al. ............... 370/338 |
| 2006/0018291 A1* | 1/2006 | Patel et al. .................. 370/335 |
| 2006/0050671 A1* | 3/2006 | Kim ............................ 370/338 |
| 2006/0104247 A1* | 5/2006 | Dommety et al. ........... 370/338 |

(Continued)

OTHER PUBLICATIONS

D. Johnson et al, Mobility Support in IPv6, pp. 1-155, Request for Comments: 3775, Network Working Group, Jun. 2004.*

(Continued)

*Primary Examiner*—Nasser Moazzami
*Assistant Examiner*—Shanto M Abedin

(57) ABSTRACT

A method, a mobile node (MN) and a correspondent node (CN) exchanging a Secret Authentication Key ($SK_{bm}$) within an IPv6 network. The MN has a pair of keys comprising a private key and a public key and a HoA. Upon displacement of the MN from a home portion to a visited portion of the IPv6 network, a CoA is set. Thereafter, an establishment message is sent from the MN to the CN through a Home Agent associated to the MN. Upon reception of the establishment message, the CN tests the HoA and the CoA and therefor sends a first portion and a second portion of a secret data. The MN thereafter sends the secret data back to the CN within a signed message. In response thereto, the CN sends an acknowledgement message to the MN comprising the $SK_{bm}$ encrypted using the public key of the MN.

11 Claims, 4 Drawing Sheets

U.S. PATENT DOCUMENTS

2006/0168446 A1* 7/2006 Ahonen et al. .............. 713/163

OTHER PUBLICATIONS

Huafei Zhu et al, Securing Return Routability Protocol Against Active Attack, pp. 1-4, IEEE, 2004.*

Robert H. Deng, Defending Against Redirect Attacks in Mobile IP, pp. 59-67, ACM, 2002.*
"RFC 791—Internet Protocol", Information Science Institute, University of Southern California, pp. 1-37, Sep. 1981.*
"Security in Mobile IPv6", Timo Koskiande, pp. 1-16, 2002.*
"Mobile IPv6", Sudha Sudanthi, pp. 1-16, 2003.*

* cited by examiner

SECRET AUTHENTICATION KEY SETUP IN MOBILE IPV6

BACKGROUND OF THE INVENTION

1. Field of the Invention

The present invention relates to Mobile Internet Protocol version 6 (Mobile IPv6) and more particularly to optimizing the authentication key setup and management in Mobile IPv6.

2. Description of the Related Art

Mobile IP version 4 (Mobile IPv4, Mobile IP, MIPv4 or MIP) and the current version of Mobile IPv6 (MIPv6) are built to provide mobility to a host or Mobile Node (MN). The other nodes, usually referred to as Correspondent Nodes as (CN), are usually seen as fixed hosts. Reference is now made to the drawings where FIG. 1 shows a MIPv6 network architecture as suggested by the current MIPv6 specification found in an Internet Engineering Task Force (IETF)'s Request For Comment (RFC) number 3775, herein included by reference. As can be seen in FIG. 1, an IP network 100 comprises a MN 110 in communication with a CN 120 on a link 122. The link 122 is unlikely to be composed of only one direct physical connection, but rather represents a series of links between routing equipments transparently enabling the communication therebetween. The way the series of links is used to transport traffic between the MN 110 and the CN 120 is irrelevant as long as IP communication therebetween can be established.

The MN 110 has a permanently assigned home address valid in its home network 127, which home address is allocated upon initialization of the MN 110 in the home network 127. The allocation mechanism falls outside the scope of the present invention. The MN 110 is further in communication with a Home Agent (HA) 130 located in its home network 127. Among other functionalities, the HA 130 keeps record of a foreign address of the MN 110 valid outside the home network 127. The foreign address is called Care-of-Address (CoA) in the context of MIPv6. The CoA assigned to the MN 110 changes in time as the MN 110 moves from one network to another. The record kept by the HA 130, referred to as binding in the context of MIPv6, ties the CoA to the home address. A binding between the home address and the CoA is also kept in the CN 120 for the purpose of reaching the MN 10. The HA 130 is also responsible for routing traffic received at the home address to the MN 110. The traffic received is forwarded by the HA 120 on a link 125 toward the MN 110. All traffic sent on the link 125, in accordance with MIPv6, is encrypted to ensure, among other things, confidentiality of credentials periodically exchanged between the MN 110 and the HA 130. It should be noted that the MN 110 may have multiple home addresses and multiple CoA addresses and that a binding should be kept at the HA 130 for each pair of home address-CoA.

The following lines are an example of how the MIPv6 concept applies in a typical situation. For the benefit of the example, the MN 110 is in bidirectional IP communication with the CN 120 on the link 122. When the MN 110 moves from a first network to another, as illustrated by an arrow 135 on FIG. 1, the MN 110 receives a new CoA. This modification in addressing state of the MN 110 must be advertised to the CN 120 and the HA 130. Prior to the advertisement, the MN 110 must first make sure that the home address, which did not change, is still valid and that the newly acquired CoA address is usable to communicate with the CN 120. This assessment is done via a return routability (RR) test or procedure. The RR procedure also allows the creation of an authentication key. For this purpose, a Care-of init cookie and a home init cookie are built by the MN 110, also protecting the RR procedure from being spoofed.

The RR procedure starts at the MN 110, which sends a Home Test Init (HoTI) message through the HA 130, on the link 125, using its home address as the source address. The HoTI message contains the home test init cookie and is addressed to the CN 120. Upon reception of the HoTI message, the HA 130 forwards it to the CN 120 on a link 140. The link 140 has the same characteristics as the link 122. Simultaneously to sending the HoTI message, the MN 110 sends a Care-of Test Init (COTI) message containing the Care-of Init cookie toward the CN 120 on the link 122 with its new CoA as the source address.

Upon reception of the CoTI message, the CN 120 replies with a Care-of Test (CoT) message addressed to the source address of the CoTI message (i.e. the MN's 110 new CoA) on the link 122. The CoT message contains the Care-of Init Cookie and a care-of keygen token generated by the CN 120. Upon reception of the HoTI message, the CN 120 replies with a HoT message addressed to the source address of the HoTI message (i.e. the MN's 110 home address) on the link 140. The HoT message contains the home Init Cookie and a home keygen token generated by the CN 120. Reception of the CoT and HoT messages at the MN 110 successfully completes the RR procedure. The MN 110 keeps the content of both the HoT And CoT messages and then continues with the advertisement of the modification of its CoA toward the CN 120 and the HA 130.

In order to advertise modification to its CoA, the MN 110 sends a first Binding Update (BU) message to the HA 130 on the encrypted link 125 containing the newly acquired CoA and other information related to the HA 130 binding. The HA 130 then updates its corresponding binding and replies to the MN 110 with a first Binding Acknowledgment (BA) indicating the successful update of the binding. The MN 110, after sending the first BU, uses the care-of keygen token and the home keygen token received earlier from the CN 120 to generate an authentication key $K_{bm}$ valid between the MN 110 and the CN 120 for a period of 210 seconds (3,5 minutes). The authentication key $K_{bm}$ is commonly referred to as binding management key in the context of MIPv6. The MN 110 then creates a second BU similar to the first BU, signs it with the key $K_{bm}$ and sends it to the CN 120 on the link 122. The CN 120, upon reception of the second BU or before, generates the same key $K_{bm}$ using the tokens it already generated and further verifies the received second BU before updating its own related bindings. The CN 120 then creates a second BA, signs it using the key $K_{bm}$ and sends it, in accordance with the MIPv6 specification, on the link 125 toward the HA 130, but addresses the second BA to the MN 110. The HA 130 simply forwards the second BA to the MN 110. Reception of the second BA at the MN 110 indicates the successful completion of the advertisement of the modification.

As mentioned earlier, the authentication key $K_{bm}$ is only valid for 210 seconds. Therefore, the RR procedure and the exchange of BU/BA need to take place repetitively within a shorter period. The interval is set to a period of 210 seconds since the authentication key $K_{bm}$ can be relatively easily retrieved, especially if the care-of keygen token and the home keygen token exchanged between the MN 110 and the CN 120 are intercepted. Once the authentication key $K_{bm}$ is known, it can be used to hijack content of the communication exchanged between the two nodes. It should further be emphasized that the current key creation mechanism does not prevent interception of the care-of keygen token and the home keygen token and, thus, does not appropriately prevent deception or spoofing of the authentication key $K_{bm}$ during its creation.

The prior art mechanism poses many problems. For instance, the RR procedure and the exchange of BU/BA trigger a lot of signaling, which is particularly costly on the path from the MN 110 to the CN 120 that goes through the HA 130. Moreover, it is inefficient due to the short period of validity of the authentication key $K_{bm}$, especially when the MN 110 does not change its CoA (i.e. remains in the same network where CoA is valid). Unfortunately, the validity period of the authentication key $K_{bm}$ cannot be increased without decreasing the level of security. Furthermore, the level of security is already low due to the weak mechanism used to obtain the authentication key $K_{bm}$.

As can be appreciated, there is a need for an efficient solution to setup and management of the authentication key used between nodes using Mobile IPv6.

SUMMARY OF THE INVENTION

The present invention provides methods and a mobile node to securely exchange an authentication key between nodes involved in a Mobile IPv6 communication. The authentication key can then further be used to authenticate content of a communication between the nodes. The authentication key is valid long enough to effectively reduce signaling overhead while continuously providing a high level of security.

A first aspect of the invention is directed to a method for exchanging a Secret Authentication Key ($SK_{bm}$) between a Mobile node (MN) and a Correspondent Node (CN) within an Internet Protocol version 6 (IPv6) network. The MN has a pair of asymmetric keys comprising a private key (K−) and a public key (K+) and a first IPv6 address (HoA) valid in a home portion of the IPv6 network. The method comprises steps of, upon displacement of the MN from the home portion of the IPv6 network to a visited portion of the IPv6 network, setting a second IPv6 address (CoA) valid in the visited portion of the IPv6 network, the CoA being set in addition to the HoA. Thereafter, the method continues with sending an establishment message from the MN addressed to the CN through a Home Agent (HA) associated to the MN. The establishment message advertises the CoA and the HA is located in the home portion of the Mobile IPv6. Upon reception of the establishment message at the CN, the method follows by sending from the CN a first address test to the MN addressed to the HoA and by sending from the CN a second address test to the MN addressed to the CoA. The first address test comprises a first portion of a secret data, the second address test comprises a second portion of the secret data and the secret data comprises only the first and second portions. Upon reception of the first address test and the second address test at the MN, the next step of the method is sending the secret data back to the CN in a single confirmation message. The confirmation message is signed by the MN using the K−. Upon reception of the confirmation message at the CN, the method follows with the step of sending an acknowledgement message to the MN addressed to the CoA. The acknowledgement message comprises the $SK_{bm}$ and at least the $SK_{bm}$ is encrypted in the acknowledgement message using the K+ of the MN.

Optionally, the step of sending an establishment message from the MN through the HA may further comprise sending the establishment message comprising the K+ to the CN through the HA. Still optional is a further step of sending a second establishment message to the CN without passing through the HA. The second establishment message could further comprise the K+.

Another optional implementation suggest that the method further comprises a step of, upon reception of the establishment message at the CN and prior to sending the first and second address tests, verifying at the CN that the MN owns the K+ and a step of, upon reception of the confirmation message at the CN and prior to sending the acknowledgement message, verifying the signature of the confirmation using the K+.

A second aspect of the present invention is directed to a Mobile Node (MN) in an Internet Protocol version 6 (IPv6) network. The MN has a pair of asymmetric keys comprising a private key (K−) and a public key (K+) and comprises an address management module and a Mobile IPv6 management module.

The address management module is capable of obtaining a subnet prefix portion a home address (HoA) assigned thereto from a router in the IPv6 network. The HoA is valid in a home portion of the IPv6 network. It is further capable of generating an Interface Identifier portion (IID) of the HoA using at least one of the K+ and the K− together with at least one of a random number and the subnet prefix portion of the HoA and, upon displacement of the MN into a visited portion of the IPv6 network, setting a care-of address (CoA) valid therein.

The Mobile IPv6 management module is capable of, during the course of a session with a Second Node (N2), sending an establishment message addressed to the N2 through a Home Agent (HA) associated to the MN. The establishment message advertises the CoA and the HA is located in the home portion of the Mobile IPv6. It is further capable of receiving from the N2 a first address test addressed to the HoA and receiving from the N2 a second address test addressed to the CoA. The first address test comprises a first portion of a secret data, the second address test comprises a second portion of the secret data and the secret data comprises only the first and second portions. The Mobile IPv6 management module is also capable of sending the secret data back to the N2 in a single confirmation message, wherein the confirmation message is signed by the MN using the K− and also capable of receiving an encrypted acknowledgement message from the N2 addressed to the CoA comprising a Secret Authentication Key ($SK_{bm}$). At least the $SK_{bm}$ is encrypted using the K+ of the MN before insertion in the acknowledgement message.

Optionally, the Mobile IPv6 management module of the MN may further be capable of, during the course of a session with a second Mobile Node (MN2) having a home IPv6 address (HoA2), receiving an establishment message 2 from the MN2 through a Home Agent 2 (HA2) associated with the MN2. The establishment message 2 advertises a Care-of Address 2 (CoA2) associated to the MN2 and the establishment message 2 comprises a public key of the MN2 (K2+). Thereafter, it may be capable of sending a HoA2 address test to the MN2 addressed to the HoA2 and sending a CoA2 address test to the MN2 addressed to the CoA. The HoA2 address test comprises a first portion of a secret data 2, the CoA2 address test comprises a second portion of the secret data 2 and the secret data 2 comprises only the first and second portions. In such an optional implementation, at least one of the CoA2 and HoA2 tests comprises an indication that the MN is mobile. Upon reception from the MN2 of a confirmation message 2 comprising the secret data 2, the Mobile IPv6 management module may be further capable of generating a Secret Authentication Key 2 ($SK_{bm}2$) and sending an acknowledgment message 2 addressed to the CoA2 of the MN2. The acknowledgment message 2 comprises the $SK_{bm}2$ encrypted using the K2+ before being inserted in the acknowledgement message 2 and the acknowledgment message 2 is signed using the K−.

A third aspect of the present invention is directed to a Correspondent Node (CN) in an Internet Protocol version 6 (IPv6) network comprising a Mobile IPv6 management module. The Mobile IPv6 management module is capable of, during the course of a session with a Mobile Node (MN) having a home IPv6 address (HoA), receiving an establishment message from the MN through a Home Agent 2 (HA) associated with the MN. The establishment message advertises a Care-of Address (CoA) associated to the MN and the establishment message comprises a public key of the MN (K+). It is further capable of sending a HoA address test to the MN addressed to the HoA and sending a CoA address test to the MN addressed to the CoA. The HoA address test comprises a first portion of a secret data, the CoA address test comprises a second portion of the secret data and the secret data comprises only the first and second portions. Upon reception from the MN of a confirmation message comprising the secret data, the Mobile IPv6 management module is further capable of generating a Secret Authentication Key ($SK_{bm}$) and sending an acknowledgment message addressed to the CoA of the MN. The acknowledgment message comprises the $SK_{bm}$ encrypted using the K+. Optionally, the CN may further comprise an address management module further capable of verifying that the MN owns the K+.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE PREFERRED EMBODIMENTS

Figure 1:
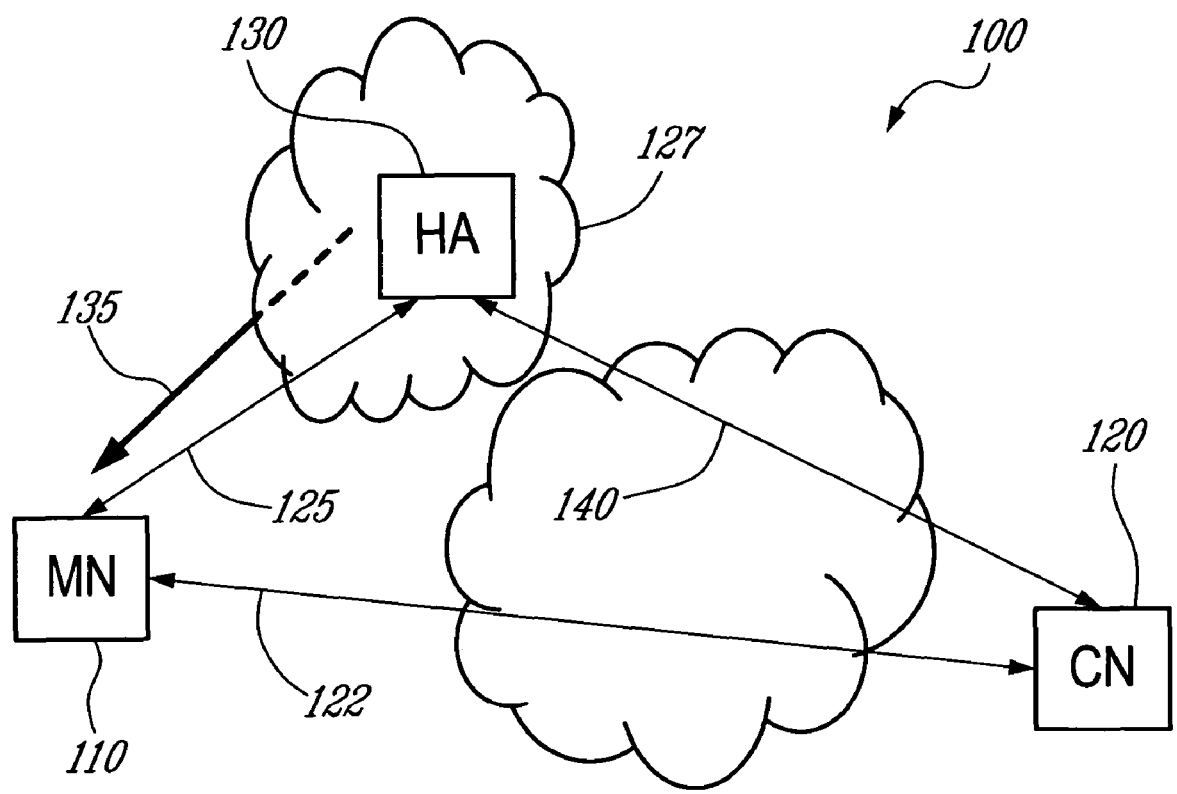
FIG. 1 is a prior art representation of a Mobile Internet Protocol version 6 architecture.
Figure 2:
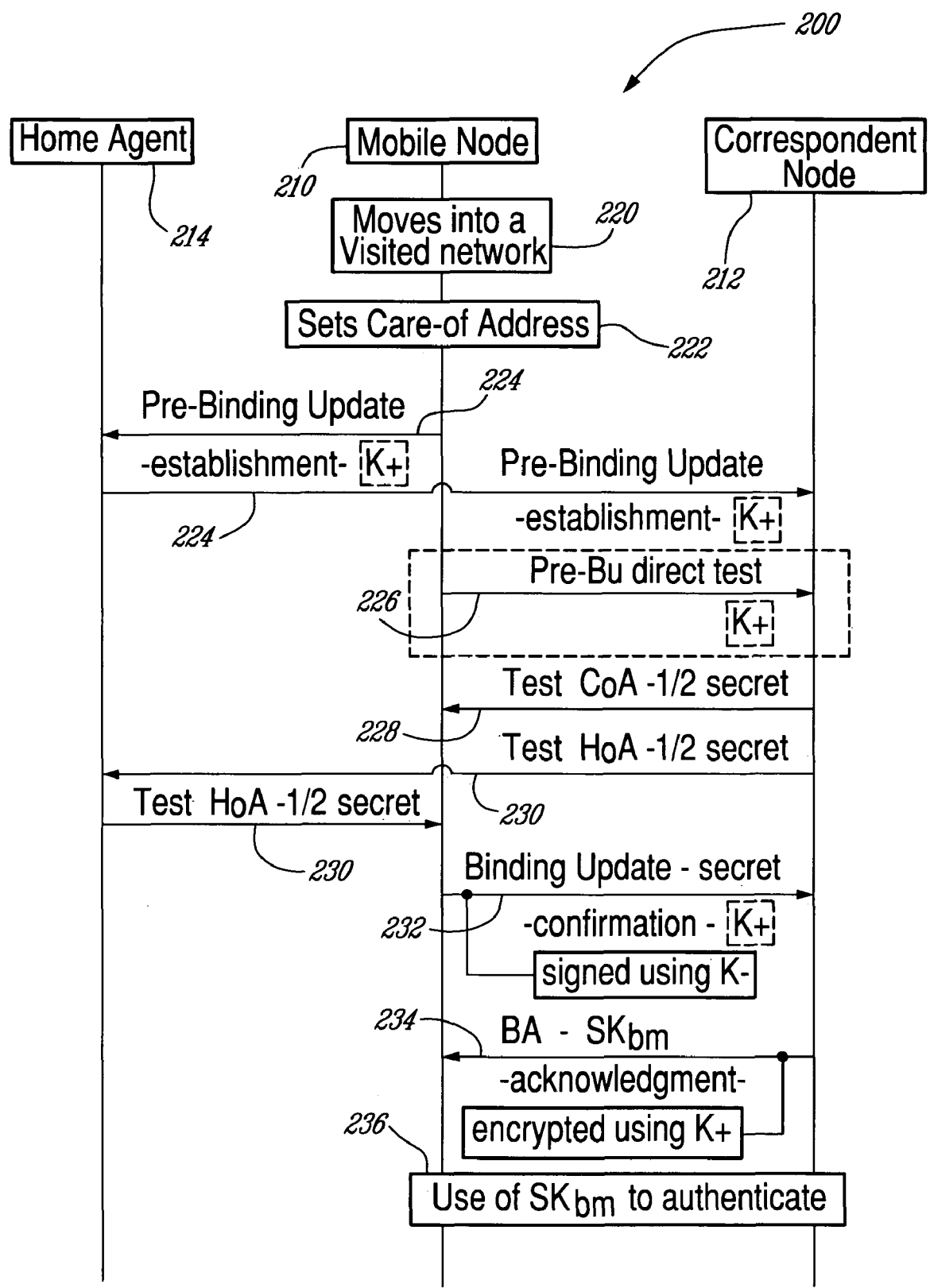
FIG. 2 is a nodal operation and flow chart of an exemplary approach to setup a secret authentication key between a mobile node and a correspondent node in accordance with the teachings of the present invention.

Reference is now made to the drawings where FIG. 2 shows a nodal operation and flow chart of an exemplary approach to setup a secret authentication key ($SK_{bm}$) between a Mobile Node (MN) 210 and a Correspondent Node (CN) 212 in an Internet Protocol version 6 (IPv6) network 200 implementing Mobile IPv6. The MN 210 is associated with a home portion of the IPv6 network 200 (also referred to as home network). The MN 210 has a first IPv6 address or Home Address (HoA) valid in the home portion of the IPv6 network 200. The HoA also serves to associate the MN 210 to a Home Agent (HA) 214 located in the home portion. All traffic addressed to the HoA is first routed to the HA 214, which forwards it to the MN 210.

The MN 210 has also a pair of asymmetric keys comprising a private key (K−) and a public key (K+). The detailed functioning of double key encryption is outside the scope of the present invention. Furthermore, the present invention takes for granted that ownership of the K+ by the MN 210 is provable. The proof of ownership can be done, for example, using a Certificate Authority, which is a trustable third party ensuring ownership of the K+. Another solution, which does not require the use of a third party is to use the K+ already used for other cryptographic mechanisms. An example of such a mechanism is the cryptographically generated address (CGA) mechanism, which also enables proof of ownership of an IPv6 address generated therewith.

When the MN 210 moves into a visited portion of the IPv6 network 200 (step 220), a second IPv6 address or Care-of Address (CoA), valid in the visited portion, is set for the MN 210 (step 222). The CoA is set in addition to the HoA. The CoA is used to reach the MN 210 directly. The way in which the CoA is set for the MN 210 is outside the scope of the present invention.

In order to remain reachable as efficiently as possible, the MN 210 needs to inform the CN 212 of its newly acquired CoA. In the context of the present invention, this is achieved by sending an establishment message 224 from the MN 210 addressed to the CN 212 through the HA 214 (i.e. routed from the HA 214 toward the CN 212). The establishment message 224 may also be referred to as a pre-Binding Update or pre-BU. The establishment message 224 advertises the CoA.

Upon reception of the establishment message 224, the CN 212 tests the reachability of the CoA and the reachability of the HoA of the MN 210. This is achieved by sending from the CN 212 a first address test 228 to the MN 210 addressed to the HoA. The first address test 228 comprises a first portion of a secret data. A second address test 230 addressed to the CoA is sent from the CN 212. The second address test 230 comprises a second portion of the secret data. The complete secret data only comprises the first and second portions. In the most common implementation, the first and second portions will both be half of the complete secret. It should be noted that the order in which the messages 228 and 230 are sent has no influence on the present invention. The denominations "first" and "second" are used to clearly differentiate between the two messages 228 and 230.

Optionally, a second establishment message 226 may be sent to the CN 212 without passing through the HA 214 (i.e. on the direct path between the MN 210 and the CN 212). In such a case, the CN 212 may wait for the two establishment messages 224 and 226 before testing the addresses. This ensures that the MN 210 does not receive a higher number of messages compared to what it sent. This can be an issue for some potential malicious attacks against the MN 210.

Upon reception of the first address test 228 and the second address test 230, the MN 210 sends the secret data back to the CN 212 in a single confirmation message 232. The confirmation message 232 is signed by the MN 210 using the K−. The confirmation message 232 may also be referred to as a Binding Update (BU).

Reception of the confirmation message 232 at the CN 212 completes the test of the CoA and HoA. Complementarily, the signature of the confirmation message 232 may be checked by the CN 212 using the K+.

The CN further sends an acknowledgement message 234 to the MN 210 addressed to the CoA. The acknowledgement message 234 comprises a secret authentication key ($SK_{bm}$) encrypted in the acknowledgement message 234 using the K+ of the MN 210. The $SK_{bm}$ is likely to be generated by the CN 212. However, it may be any data compatible with the authentication function of Mobile IPv6, which can further be kept secret by the CN 212. The acknowledgement message 234 may also be referred to as Binding Acknowledgment. Upon reception of the acknowledgement message 234, the MN 210 decrypts the $SK_{bm}$ using the K−. Thereafter, both the CN 212 and the MN 210 have the same $SK_{bm}$ to authenticate the communication therebetween (step 236).

The K+ of the MN 210 may be advertised in many different ways. One of these is to send the K+ in the establishment message 224. The K+ may further be inserted in the establishment message 226 and the confirmation message 232. It could also be inserted only in one message 224, 226 or 232 or any combination of messages 224, 226 and 232. At any moment before using the K+, the CN 212 may verify that the MN 210 owns the K+. Depending on the mechanism used to generate the K+, this may be achieved in many different ways, which fall outside the scope of the present invention.

Figure 3:
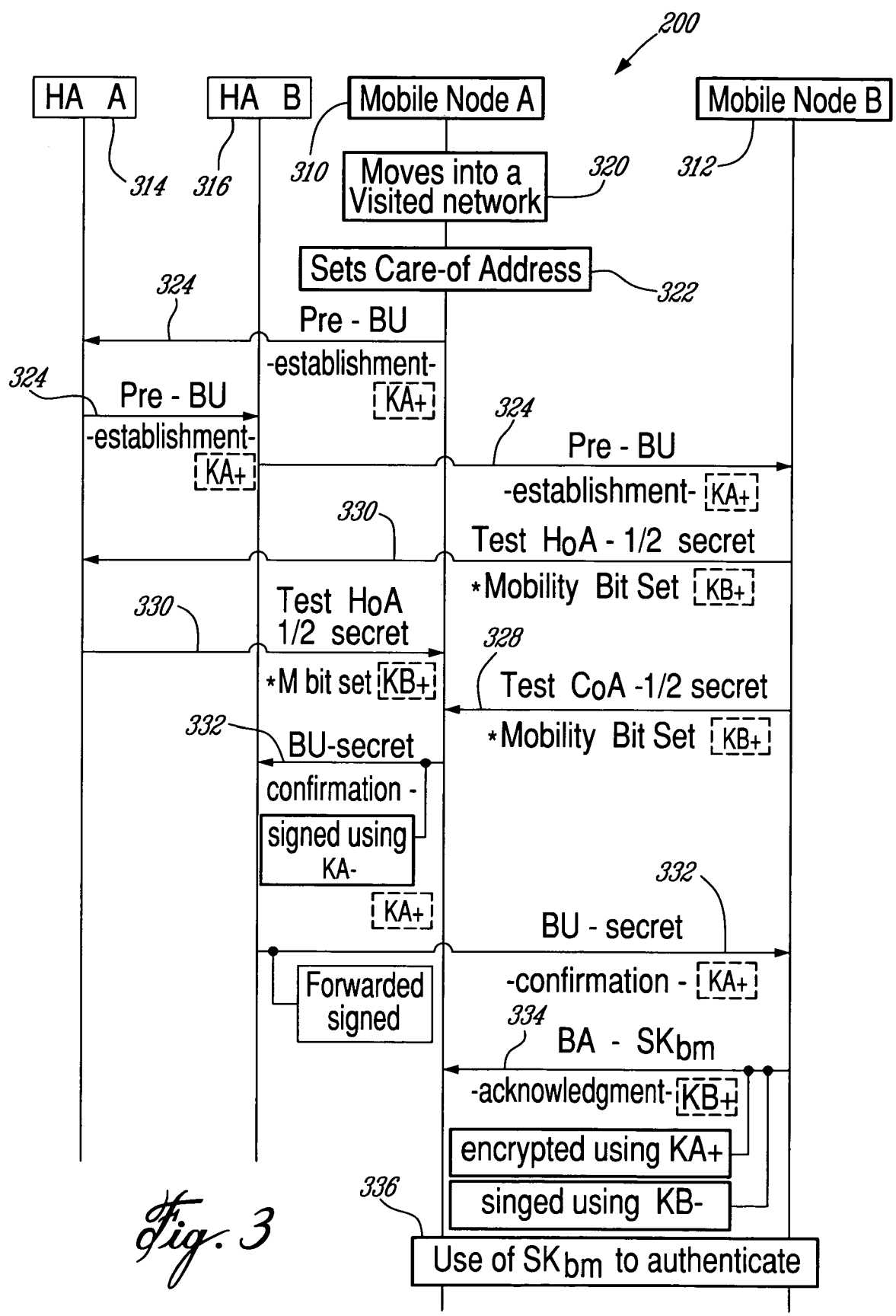
FIG. 3 is a nodal operation and flow chart of an exemplary approach to setup a secret authentication key between two mobile nodes in accordance with the teachings of the present invention.

FIG. 3 shows a nodal operation and flow chart of an exemplary approach to setup a secret authentication key ($SK_{bm}$) between two mobile nodes MNa 310 and MNb 312 in the IPv6 network 200. The MNa 310 is associated with a home portion of the IPv6 network 200 (also referred to as home network). The MNa 310 has a first IPv6 address or Home Address (HoAa) valid in the home portion of the IPv6 network 200. The HoAa also serves to associate the MVTa 310 to a Home Agent (HAa) 314 located in the home portion. All traffic addressed to the HoAa is first routed to the HAa 314, which forwards it to the MNa 310. Likewise, the MNb 312 is associated with a home portion of the IPv6 network 200 (also referred to as home network). The MNa 310 has a first IPv6 address or Home Address (HoAb) valid in the home portion of the IPv6 network 200. The HoAb also serves to associate the MNb 312 to a Home Agent (HAb) 316 located in the home portion. All traffic addressed to the HoAb is first routed to the HAb 316, which forwards it to the MN 312.

The MNa 310 has also a pair of asymmetric keys comprising a private key (Ka−) and a public key (Ka+). Similarly, the MNb 312 has also a pair of asymmetric keys comprising a private key (Kb−) and a public key (Kb+). Just as mentioned previously, the present invention takes for granted that ownership of the Ka+ by the MNa 310 and ownership of the Kb+ by the MNb 312 are provable.

When the MNa 310 moves into a visited portion of the IPv6 network 200 (step 320), a second IPv6 address or Care-of Address (CoAa), valid in the visited portion, is set for the MNa 310 (step 322). The CoAa is set in addition to the HoAa. The CoAa is used to reach the MNa 310 directly. The way in which the CoAa is set for the MNa 310 is outside the scope of the present invention.

In order to remain reachable as efficiently as possible, the MNa 310 needs to inform the MNb 312 of its newly acquired CoAa. In the context of the present invention, this is achieved by sending an establishment message 324 from the MNa 310 addressed to the MNb 312 through the HAa 314 (i.e. routed from the HAa 314 toward the MNb 312). The establishment message 324 may also be referred to as a pre-Binding Update or pre-BU. The establishment message 324 advertises the CoAa. Since MNb 312 is a mobile node, the establishment message 324, just like all other messages, are likely to be routed up to the MNb 312 through its HAb 316. This is transparent to the MNa 310 as long as the MNa 310 is not aware of the mobile nature of the MNb 312.

Upon reception of the establishment message 324, the MNb 312 tests the reachability of the CoAa and the reachability of the HoAa of the MNa 310. This is achieved by sending from the MNb 312 a first address test 328 to the MNa 310 addressed to the HoAa. The first address test 328 comprises a first portion of a secret data. A second address test 330 addressed to the CoAa is sent from the MNb 312. The second address test 330 comprises a second portion of the secret data. The complete secret data only comprises the first and second portions. In the most common implementation, the first and second portions will both be half of the complete secret. It should be noted that the order in which the messages 328 and 330 are sent has no influence on the present invention. The denominations "first" and "second" are used to clearly differentiate between the two messages 328 and 330.

Optionally, a second establishment message (not shown) may be sent to the MNb 312 without passing through the HAa 314 (i.e. on the direct path between the MNa 310 and the MNb 312). In such a case, the MNb 312 may wait for the two establishment messages before testing the addresses. This ensures that the MNa 310 does not receive a higher number of messages compared to what it sent. This can be an issue for some potential malicious attacks against the MNa 310. In at least one of the two test messages 328 and 330, the MNb 312 sets a Mobility Bit (M bit) to inform the MNa 310 that MNb 312 is a mobile node.

Upon reception of the first address test 328 and the second address test 330, the MNa 310 sends the secret data back to the MNb 312 in a single confirmation message 332. The confirmation message 332 is signed by the MNa 310 using the Ka−. The confirmation message 332 may also be referred to as a Binding Update (BU). The MNa 310 also notes that the MNb 312 is a mobile node since the M bit is set.

Reception of the confirmation message 332 at the MNb 312 completes the test of the CoAa and HoAa. Complementarily, the signature of the confirmation message 332 may be checked by the MNb 312 using the Ka+.

The MNb, 312 further sends an acknowledgement message 334 to the MNa 210 addressed to the CoAa. The acknowledgement message 334 comprises a secret authentication key ($SK_{bm}$). encrypted in the acknowledgement message 334 using the Ka+ of the MNa 310. The $SK_{bm}$ is likely to be generated by the MNb 312. However, it may be any data compatible with the authentication function of Mobile IPv6, which can further be kept secret by the MNb 312. The acknowledgement message 334 is further signed by the MNb using the Kb+. The acknowledgement message 334 may also be referred to as Binding Acknowledgment. Upon reception of the acknowledgement message 334, the MNa 310 decrypts the $SK_{bm}$ using the Ka− and verifies the signature of the acknowledgement message using Kb+. Thereafter, both the MNb 312 and the MNa 310 have the same $SK_{bm}$ to authenticate the communication therebetween (step 336).

The Ka+ of the MNa 310 may be advertised in many different ways. One of these is to send the Ka+ in the establishment message 324. The K+ may further be inserted in the second establishment message and the confirmation message 332. It could also be inserted only in one message or any combination of messages. At any moment before using the Ka+, the MNb 312 may verify that the MNa 310 owns the Ka+. Depending on the mechanism used to generate the Ka+, this may be achieved in many different ways, which fall outside the scope of the present invention.

Likewise, the Kb+ of the MNb 312 may be advertised in many different ways. One of these is to send the Kb+ in the test messages 328 and 330. The Kb+ may further be inserted in the acknowledgement message 334. It could also be inserted only in one message or any combination of messages. At any moment before using the Kb+, the MNa 310 may verify that the MNb 312 owns the Kb+. Depending on the mechanism used to generate the Kb+, this may be achieved in many different ways, which fall outside the scope of the present invention.

As can be appreciated, there are differences between the steps shown on FIG. 2 and the steps shown on FIG. 3. For example, the test messages 228 and 230 do not contain a M bit as the test messages 328 and 330. The acknowledgement message 234 is also unsigned in comparison to the acknowledgement message 334.

Figure 4:
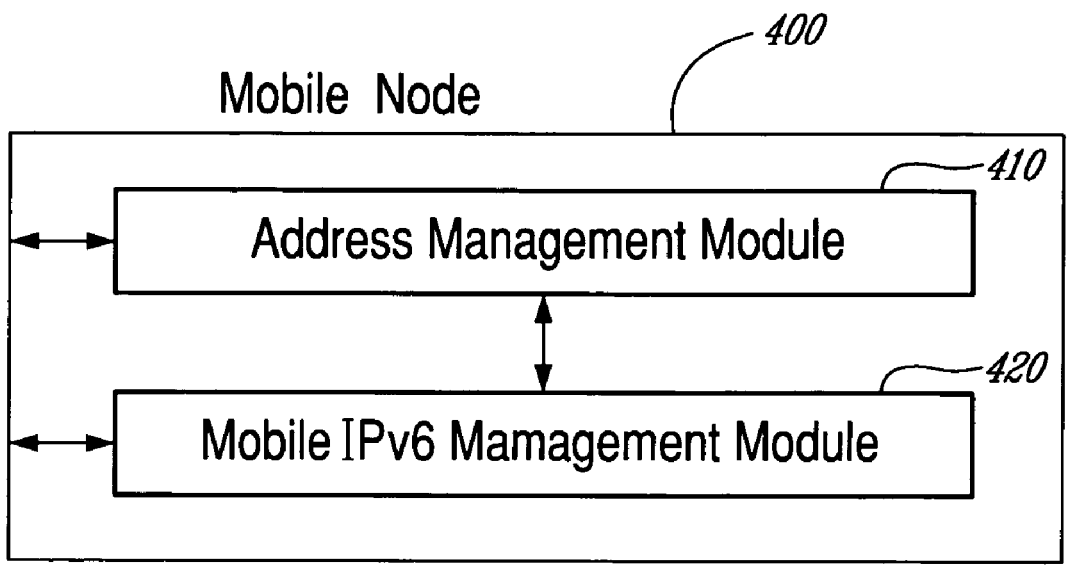
FIG. 4 is a modular representation of an exemplary Mobile Node in accordance with the teachings of the present invention.

FIG. 4 shows a modular representation of an exemplary Mobile Node (MN) 400. The MN 400 is in an Internet Protocol version 6 (IPv6) network and has a pair of asymmetric keys comprising a private key (K−) and a public key (K+). The MN 400 comprises an address management module 410. The capabilities of the address management module 410 comprise obtaining a subnet prefix portion a home address (HoA) assigned thereto from a router in the IPv6 network, the HoA being valid in a home portion of the IPv6 network, generating an Interface Identifier portion (IID) of the HoA using at least one of the K+ and the K− together with at least one of a random number and the subnet prefix portion of the HoA and, upon displacement of the MN 400 into a visited portion of the IPv6 network, setting a care-of address (CoA) valid therein.

The MN 400 further comprises a Mobile IPv6 management module 420 capable of, during the course of a session with a Second Node (N2), sending an establishment message addressed to the N2 through a Home Agent (HA) associated to the MN 400. Similarly to the preceding examples, the establishment message advertises the CoA and the HA is located in the home portion of the Mobile IPv6. The Mobile IPv6 management module 420 is further capable of receiving from the N2 a first address test addressed to the HoA comprising a first portion of a secret data and receiving from the N2 a second address test addressed to the CoA comprising a second portion of the secret data. Again, the secret data comprises only the first and second portions. Furthermore, the Mobile IPv6 management module 420 is capable of sending the secret data back to the N2 in a single confirmation message signed using the K−. The Mobile IPv6 management module 420 is also capable of receiving an encrypted acknowledgement message from the N2 addressed to the CoA comprising a Secret Authentication Key ($SK_{bm}$), wherein at least the $SK_{bm}$ is encrypted using the K+ of the MN 400 before insertion in the acknowledgement message. In the present context, an encrypted message refers to a message that contains at least one encrypted data portion.

The preceding behavior of the MN 400 can be assimilated to the other example shown on FIG. 2 while the following example is similar to FIG. 3. In such a case, the Mobile IPv6 management module 420 is further capable of, during the course of a session with a second Mobile Node (MN2) having a home IPv6 address (HoA2), receiving an establishment message 2 from the MN2 through a Home Agent 2 (HA2) associated with the MN2. The establishment message 2 advertises a Care-of Address 2 (CoA2) associated to the MN2 and wherein the establishment message 2 comprises a public key of the MN2 (K2+). In response thereto, the Mobile IPv6 management module 420 sends a HoA2 address test to the MN2 addressed to the HoA2, and sends a CoA2 address test to the MN2 addressed to the CoA. The HoA2 address test comprises a first portion of a secret data 2 and the CoA2 address test comprises a second portion of the secret data 2. The secret data 2 comprises only the first and second portions. In this example, at least one of the CoA2 and HoA2 tests comprises an indication that the MN 400 is mobile (M bit);

Upon reception from the MN2 of a confirmation message 2 comprising the secret data 2, the Mobile IPv6 management module 420 is further capable of generating a Secret Authentication Key 2 ($SK_{bm}2$) and sending an acknowledgment message 2 addressed to the CoA2 of the MN2, which comprises the $SK_{bm}2$ encrypted using the K2+ before being inserted in the acknowledgement message 2. The acknowledgment message 2 is further signed using the K−.

Figure 5:
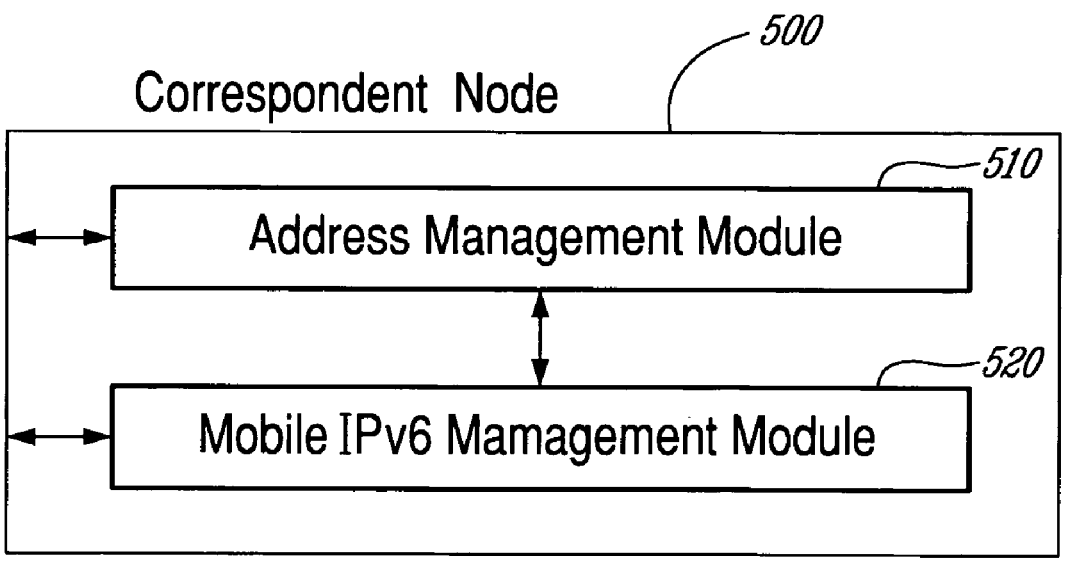
FIG. 5 is a modular representation of an exemplary Correspondent Node in accordance with the teachings of the present invention.

FIG. 5 shows a modular representation of an exemplary Correspondent Node (CN) 500 in a Internet Protocol version 6 (IPv6) network comprising a Mobile IPv6 management module 510 capable of, during the course of a session with a Mobile Node (MN) having a home IPv6 address (HoA), receiving an establishment message from the MN through a Home Agent 2 (HA) associated with the MN. The establishment message advertises a Care-of Address (CoA) associated to the MN and the establishment message comprises a public key of the MN (K+). The Mobile IPv6 management module 510 is further capable of sending a HoA address test to the MN addressed to the HoA and sending a CoA address test to the MN addressed to the CoA. The HoA address test comprises a first portion of a secret data and the CoA address test comprises a second portion of the secret data. The secret data comprises only the first and second portions.

Upon reception from the MN of a confirmation message comprising the secret data, the Mobile IPv6 management module 510 is further capable of generating a Secret Authentication Key ($SK_{bm}$) and sending an acknowledgment message addressed to the CoA of the MN comprising the $SK_{bm}$ encrypted using the K+. The CN 500 may further comprise an address management module 520 capable of verifying that the MN owns the K+.

Although several examples of the present invention have been illustrated in the accompanying drawings and described in the foregoing description, it will be understood that the invention is not limited to the embodiments disclosed, but is capable of numerous rearrangements, modifications and substitutions without departing from the teachings of the present invention. For example, even though the Figures present a communication between two nodes to facilitate understanding, this is not to be construed as a pre-requisite of the present invention. Indeed, the solution applies to sessions involving more than two nodes. Furthermore, communication between nodes is likely to involve routing and forwarding of the information between many intermediate nodes. This does not affect present the invention and therefore is not mentioned explicitly in the description. In general, statements made in the description of the present invention do not necessarily limit any of the various claimed aspects of the present invention. Moreover, some statements may apply to some inventive features but not to others. In the drawings, like or similar elements are designated with identical reference numerals throughout the several views, and the various elements depicted are not necessarily drawn to scale.

What is claimed is:

1. A method for exchanging a Secret Authentication Key ($SK_{bm}$) between a Mobile node (MN) and a Correspondent Node (CN) within a Internet Protocol version 6 (IPv6) network, wherein the MN has a pair of asymmetric keys comprising a private key (K−) and a public key (K+) and wherein the MN has a first IPv6 address (HoA) valid in a home portion of the IPv6 network, the method comprising steps of:

upon displacement of the MN from the home portion of the IPv6 network to a visited portion of the IPv6 network, setting a second IPv6 address (CoA) valid in the visited portion of the IPv6 network, the CoA being set in addition to the HoA;

sending an establishment message from the MN addressed to the CN through a Home Agent (HA) associated to the MN, wherein the establishment message advertises the CoA and wherein the HA is located in the home portion of the Mobile IPv6;

upon reception of the establishment message at the CN:
  sending from the CN a first address test to the MN addressed to the HoA, wherein the first address test comprises a first portion of a secret data; and
  sending from the CN a second address test to the MN addressed to the CoA, wherein the second address test comprises a second portion of the secret data and wherein the secret data comprises only the first and second portions; and where the $SK_{bm}$ and the secret data are different;

upon reception of the first address test and the second address test at the MN, sending the secret data back to the CN in a single confirmation message, wherein the confirmation message is signed by the MN using the K−; and upon reception of the confirmation message at the CN, sending an acknowledgement message to the MN addressed to the CoA, wherein the acknowledgement message comprises the $SK_{bm}$ and wherein at least the $SK_{bm}$ is encrypted in the acknowledgement message using the K+ of the MN.

2. The method of claim 1 further comprising a step of generating at the MN an Interface Identifier portion (IID) of the HoA using at least one of the K+ and the K− together with at least one of a random number and a subnet prefix portion of the HoA, wherein the HoA comprises only the subnet prefix portion and the IID.

3. The method of claim 1 wherein the step of sending an establishment message from the MN through the HA further comprises sending the establishment message comprising the K+ to the CN through the HA.

4. The method of claim 1 further comprising a step of sending a second establishment message to the CN without passing through the HA, wherein the second establishment message comprises the K+.

5. The method of claim 1 further comprising a step of, upon reception of the establishment message at the CN and prior to sending the first and second address tests, verifying at the CN that the MN owns the K+ and a step of, upon reception of the confirmation message at the CN and prior to sending the acknowledgement message, verifying the signature of the confirmation using the K+.

6. A hardware and software implemented Mobile Node (MN) in a Internet Protocol version 6 (IPv6) network wherein the MN has a pair of asymmetric keys comprising a private key (K−) and a public key (K+), the MN comprising:
  an address management module that:
    obtains a subnet prefix portion a home address (HoA) assigned thereto from a router in the IPv6 network, the HoA being valid in a home portion of the IPv6 network;
    generates an Interface Identifier portion (IID) of the HoA using at least one of the K+ and the K− together with at least one of a random number and the subnet prefix portion of the HoA; and
    upon displacement of the MN into a visited portion of the IPv6 network, setting a care-of address (CoA) valid therein; and
  a Mobile IPv6 management module that:
    during the course of a session with a Second Node (N2), sends an establishment message addressed to the N2 through a Home Agent (HA) associated to the MN, wherein the establishment message advertises the CoA and wherein the HA is located in the home portion of the Mobile IPv6;
    receives from the N2 a first address test addressed to the HoA, wherein the first address test comprises a first portion of a secret data;
    receives from the N2 a second address test addressed to the CoA, wherein the second address test comprises a second portion of the secret data and wherein the secret data comprises only the first and second portions;
    sends the secret data back to the N2 in a single confirmation message, wherein the confirmation message is signed by the MN using the K−; and
    receives an encrypted acknowledgement message from the N2 addressed to the CoA comprising a Secret Authentication Key ($SK_{bm}$), wherein at least the $SK_{bm}$ is encrypted using the K+ of the MN before insertion in the acknowledgement message.

7. The MN of claim 6 wherein the Mobile IPv6 management module is further capable of inserting K+ in the establishment message before sending the establishment message to the N2.

8. The MN of claim 7 wherein the Mobile IPv6 management module is further capable of:
  during the course of a session with a second Mobile Node (MN2) having a home IPv6 address (HoA2), receiving an establishment message 2 from the MN2 through a Home Agent 2 (HA2) associated with the MN2, wherein the establishment message 2 advertises a Care-of Address 2 (CoA2) associated to the MN2 and wherein the establishment message 2 comprises a public key of the MN2 (K2+);
  sending a HoA2 address test to the MN2 addressed to the HoA2, wherein the HoA2 address test comprises a first portion of a secret data 2;
  sending a CoA2 address test to the MN2 addressed to the CoA, wherein the CoA2 address test comprises a second portion of the secret data 2 and wherein the secret data 2 comprises only the first and second portions;
  wherein at least one of the CoA2 and HoA2 tests comprises an indication that the MN is mobile;
  upon reception from the MN2 of a confirmation message 2 comprising the secret data 2, generating a Secret Authentication Key 2 ($SK_{bm}2$); and
  sending an acknowledgment message 2 addressed to the CoA2 of the MN2 wherein the acknowledgment message 2 comprises the $SK_{bm}2$ encrypted using the K2+ before being inserted in the acknowledgement message 2 and wherein the acknowledgment message 2 is signed using the K−.

9. The MN of claim 8 wherein the address management module is further capable of verifying that the MN2 owns the K2+.

10. A hardware and software implemented Correspondent Node (CN) in a Internet Protocol version 6 (IPv6) network comprising:
  a Mobile IPv6 management module that:
    during the course of a session with a Mobile Node (MN) having a home IPv6 address (HoA), receives an establishment message from the MN through a Home Agent 2 (HA) associated with the MN, wherein the establishment message advertises a Care-of Address (CoA) associated to the MN and wherein the establishment message comprises a public key of the MN (K+);

sends a HoA address test to the MN addressed to the HoA, wherein the HoA address test comprises a first portion of a secret data;

sends a CoA address test to the MN addressed to the CoA, wherein the CoA address test comprises a second portion of the secret data and wherein the secret data comprises only the first and second portions;

upon reception from the MN of a confirmation message comprising the secret data, generating a Secret Authentication Key ($SK_{bm}$) different from the secret data; and sends an acknowledgment message addressed to the CoA of the MN wherein the acknowledgment message comprises the $SK_{bm}$ encrypted using the K+.

11. The CN of claim 10 further comprising an address management module further capable of verifying that the MN owns the K+.

* * * * *